United States Patent [19]

Schmidt-Roedenbeck et al.

[11] 4,217,754
[45] Aug. 19, 1980

[54] APPARATUS FOR CONTROLLING THE ROTARY SPEED IN TURBO-JET ENGINES FOR AIRCRAFT

[75] Inventors: Heiner Schmidt-Roedenbeck; Peter Wüst, both of Überlingen; Wilfried Wellern, Uhldingen-Mühlhofen, all of Fed. Rep. of Germany

[73] Assignee: Bodenseewerk Geratetechnik GmbH, Uberlingen, Fed. Rep. of Germany

[21] Appl. No.: 48,690

[22] Filed: Jun. 14, 1979

Related U.S. Application Data

[63] Continuation of Ser. No. 853,350, Nov. 21, 1977, abandoned.

[30] Foreign Application Priority Data

Jan. 22, 1977 [DE] Fed. Rep. of Germany ....... 2702564

[51] Int. Cl.³ .................................................. F02C 9/04
[52] U.S. Cl. ............................................... 60/39.28 R
[58] Field of Search ................................... 60/39.28 R

[56] References Cited

U.S. PATENT DOCUMENTS

| 3,882,672 | 5/1975 | Bauerfeind | 60/39.28 R |
| 4,018,044 | 4/1977 | Joby et al. | 60/39.28 R |
| 4,040,250 | 8/1977 | Saunders et al. | 60/39.28 R |

*Primary Examiner*—Robert E. Garrett
*Attorney, Agent, or Firm*—Darbo & Vandenburgh

[57] ABSTRACT

A control device produces a control deviation signal representing the difference between the commanded engine speed and the actual engine speed. Before this signal is applied to a fuel control unit to establish the rate of fuel flow to the engine, its time derivative is limited to a value substantially proportional to the distance that the operating state of the engine is from the surge line. In one embodiment the control deviation signal is differentiated with a lag corresponding to the lag of the fuel control unit before effecting said limiting and, after said limiting is effected, is integrated with a lead corresponding to said lag.

3 Claims, 3 Drawing Figures

APPARATUS FOR CONTROLLING THE ROTARY SPEED IN TURBO-JET ENGINES FOR AIRCRAFT

RELATED APPLICATION

This is a continuation of application Ser. No. 853,350, filed Nov. 21, 1977, and now abandoned.

BACKGROUND AND SUMMARY OF THE INVENTION

The invention relates to a device for controlling the rotary speed in turbo-jet engines for aircraft and comprising: a rotary speed sensor which provides a rotary speed signal representing the rotary speed of the high-pressure compressor of the jet engine, a commanded value generator which provides a commanded value signal representing a commanded rotary speed, a control device, to which the rotary speed signal and the commanded value signal are applied and which is arranged to provide a control deviation signal, a fuel control unit which is arranged to be controlled by the control deviation signal for metering a fuel flow supplied to the jet engine, a pressure ratio generator for generating a pressure ratio signal which represents the pressure ratio of the outlet and the inlet pressures of the high-pressure compressor, a mass flow sensor for generating a mass flow signal representing the mass flow of the jet engine, a function generator which provides the surge line of the jet engine or a surge line limit curve running at a safety margin therefrom in the form of a limit pressure ratio signal as a function of the mass flow signal, signal limiting means between control device and fuel control unit, said means effecting limitation of the control deviation signal in accordance with the surge line distance obtained as difference of the limit pressure ratio signal and the pressure ratio signal.

In a single axis jet engine a compressor having a plurality of annular arrays of blades and a turbine are positioned one behind the other on a shaft. A combustion chamber is located between compressor and turbine. Fuel, metered by a fuel control unit, is supplied continuously into that combustion chamber. Air sucked in at the front of the engine is compressed by the compressor. The air is heated by reason of its compression. The fuel is injected into this compressed and heated air in the combustion chamber and is ignited. The hot propellent gases thereby generated are expelled at high velocity through a nozzle at the rear of the jet engine and generate the thrust of the jet engine. The energy for driving the compressor is taken from the propellent gas stream by the turbine. For better adaptation to the various operating states multiple axes jet engines are known. These comprise an inner shaft and one or two hollow outer shafts which enclose the inner shaft. On each shaft a compressor is located in front of the combustion chamber, and a turbine driving this compressor is located behind the combustion chamber. The compressors are arranged one axially behind the other, and also the associated turbines are located one behind the other, with the order being reversed. Each compressor is driven by the associated turbine at at least approximately optimum rotational speed. The control of the rotary speed of such a jet engine presents certain problems.

Due to the inertia of the rotating engine rotor, composed of compressor, shaft and turbine, the rotary speed of the engine rotor varies relatively slowly as compared to the variations of the pressures, temperatures and of the mass flow, i.e., of the air flow delivered by the compressor, caused by interventions or disturbances. When the rotary speed of the jet engine is to be increased and, correspondingly, an increase of the metered fuel flow iw effected, this increase does cause an immediate increase of pressure in the combustion chamber but does not cause an immediate corresponding increase of the rotary speed. Thus the compressor operates against an increased pressure but with, at first, unchanged rotary speed. Thereby the mass flow drops. Initially the pressure ratio of outlet and inlet pressures rises as the pressure at the outlet of the high-pressure compressor is increased without this increase of pressure becoming completely effective at the inlet of the high-pressure compressor. With further decrease of the mass flow and, at first, unvariable rotary speed, the pressure ratio will drop again.

This variation of the pressure ratio can also be considered as follows: With constant rotary speed of high-pressure compressor the ratio of outlet and inlet pressures rises at first with increasing mass flow. The more air that is delivered by the high-pressure compressor the greater is the rise in pressure thereacross. From a maximum on, which maximum corresponds to the mass flow for which the high-pressure compressor has been designed as the optimum, the pressure ratio will drop again with increasing mass flow. The high-pressure compressor is not able to further compress the air sucked in with the predetermined rotary speed, and it will then no longer progressively operate as a compressor but as a restrictor, across which the pressure drops again.

The variation of the pressure ratio as a function of the mass flow with constant rotary speed is illustrated in FIG. 1. Reduction of the mass flow, for example beyond point D in FIG. 1 with a corresponding pressure ratio derived from the curve of FIG. 1, results in an instable state which may cause "surging" of the jet engine. Within the range between the points A and D of FIG. 1 the slope of the pressure ratio curve is positive. With decreasing mass flow the pressure ratio will become smaller. When, in a point P of this range, the mass flow of the high-pressure compressor drops temporarily due to some disturbance, for example because the air intake opening of the jet engine temporarily gets into the lee, this will be accompanied by a fall of the delivery pressure of the high-pressure compressor. If the pressure downstream of the high-pressure compressor, i.e., in the combustion chamber or in the last compressor stages, does not fall quickly enough, the flow will tend to reverse its direction. When this occurs, the pressure ratio drops rapidly. Meanwhile the pressure downstream of the compressor has fallen also, so that the compressor now begins to operate again. This cycle is then repeated at high frequency and results in heavy aerodynamic pulsation, the "surging", by which the jet engine can be destroyed within a few seconds. Therefore such surging of the jet engine must be prevented safely.

As explained above, the mass flow and pressure ratio of the jet engine may quickly get into the range between D and A of FIG. 1 in which the risk of "surging" exists by an increase in the fuel flow rate with, initially, yet unchanged rotary speed, and this surging may be triggered by minor disturbances. Therefore it is necessary to limit the fuel flow rate, when accelerating the jet engine, to avoid passing the "surge line" or preferably a "surge line limit curve" running at a safety distance from the surge line which separates the stable and the instable ranges in the mass flow versus pressure ratio field.

This situation will be explained in greater detail with reference to FIG. 2. There a family of curves is illustrated comprising curves similar to the curve of FIG. 1 and associated with different rotary speeds. For each rotary speed there is a point on the respective curve corresponding to point D of FIG. 1, at which point the instable range begins. The locus of these points is the surge line. The surge line limit curve runs at a safety distance from this surge line. With acceleration of the jet engine to a higher rotary speed, for example from 0.6 to 1.0, which should be achieved as quickly as possible, just so much fuel should be metered that the surge line limit curve is just reached from point $P_1$ in FIG. 2 along the "0.6" curve and the mass flow and pressure ratio are increased with now increasing rotary speed just in such a way that the point characterizing the state of the engine moves along the surge line limit curve (the dashed line) until the "1.0" curve is reached. At this rotary speed the jet engine should change over into its stable new operating state along the "0.1" curve. However, such performance, with overshooting being safely prevented, is difficult to achieve.

It has already been proposed to provide a pressure ratio generator for generating a pressure ratio signal which represents the pressure ratio of the outlet and inlet pressures of the high-pressure compressor. Furthermore, there is a mass flow sensor for generating a mass flow signal representing the mass flow through the jet engine. A function generator provides the surge line limit curve in the form of a limit pressure ratio signal as a function of the mass flow signal. In order to avoid overshooting beyond the surge line limit curve, signal limiting means are provided for limiting the control device output signal supplied to the fuel control unit. These means limit the control output signal to a value which is determined by the difference of the pressure ratio signal provided by the pressure ratio qenerator and of the limit pressure ratio signal.

In the previously proposed device the value to which the control device output signal is limited is a linear combination of the said difference (surge line distance) and of its time derivative. As the fuel control unit has inertia, a limiting of the control device output signal to a value proportional to the surge line distance would result in overshooting over the surge line limit curve. It should be noted that with large control device output signals, as they occur when the jet engine is accelerated heavily, the fuel flow rate will be determined, at first, by the limitation only. To damp hunting, the time derivative of the surge line distance is applied.

With such an arrangement the actual distance from the surge line limit curve enters the limit in the form of a linear combination only. Therefore the signal limiting means never "knows" how far from the surge line limit curve the state of the jet engine as characterized by mass flow and pressure ratio actually is. The possibility even of a damped overshooting makes it necessary to keep the surge line limit curve at a respectful distance from the actual surge line. This, in turn, limits the acceleration with which the jet engine may be run up to a higher rotational speed and thus to higher power.

It is the object of the invention to provide a device of the type initially defined for use with jet engines for aircraft, which permits optimum quick change of the rotational speed, but to avoid safely any passing of the surge line limit curve. In the invention this object is achieved by the signal limiting means acting to limit the time derivative of the fuel flow metered by the fuel control unit to a value substantially proportional to the surge line distance.

In accordance with the invention the fuel flow rate is not limited directly but rather the limitation is the time derivative thereof. The smaller that the surge line distance from the surge line becomes, the slower will be the change in the fuel flow rate. When the surge line limit curve has been reached, the rate of change of the fuel flow rate becomes zero, i.e., the fuel flow rate remains constant. It is essential now that the increase of the rotary speed following with lag the increase of the fuel flow rate results in an increase of the mass flow and, because of the constant fuel flow, in a reduction of the combustion chamber temperature, and thus tends to again remove the operating pressure ratio from the surge line limit curve. With reasonable application of the surge line distance any passing of the surge line limit curve is safely prevented. The "control operation" described, with increase of the fuel flow rate until the surge line limit curve is approached and a constant fuel flow rate is achieved, the increase of the rotary speed and thereby of the mass flow, following with lag and the removal of the operating pressure ratio from the surge line limit curve, is then repeated, so that the state of the jet engine eventually travels along the surge line limit curve (as in FIG. 2), until the selected rotary speed (for example 1.0) has been reached. Then such a state at a distance from the surge line limit curve arises that the metered fuel flow is no longer determined by the limitation but by the control device output signal itself. Thereupon the state of the jet engine travels along the "1.0" curve in FIG. 2, as illustrated there by the dashed line, to the new stable state at point $P_2$. It presents certain problems to obtain accurately and, above all, without lag a signal which represents the time derivative of the metered fuel flow.

In accordance with a further feature of the invention, the limitation is effected in such a way, that the control device output signal is differentiated with a lag and is then applied to the fuel control unit integrated with a lead corresponding to this lag, that the transient response of the lag is selected equal to the transient response of the fuel control unit and that the signal limiting means effect limitation of the control device output signal differentiated with lag.

With such an arrangement and with normal control operation without limitation, i.e., with sufficient distance of the operating pressure ratio from the surge line limit curve, the control device output signal is applied directly to the fuel control unit, as the differentiation with lag having a transfer function $$s/(1+Ts)$$

and the integration with lead, having a transfer function $$(1+Ts)/s$$

cancel each other. Limitation is effected between this differentiation and the integration, where at any rate, whether the limitation is effective or not, the time derivative $\dot{M}$ of the fuel flow rate is available free from lag, as will be shown hereinbelow. The signal limited to a value proportional to the surge line distance, with the limitation becoming effective, is integrated with the lead and is applied to the fuel control unit, which supplies, with a lag according to a transfer function, a fuel flow M proportional to the applied signal to the jet engine. As $T=T_{FCU}$ is selected, the transfer function between the limited signal and the output M of the fuel control unit is $$\frac{1+Ts}{s} \cdot \frac{1}{1+Ts} = \frac{1}{s},$$

i.e., the limited signal represents the undelayed time derivative $\dot{M}$ of the fuel flow rate M.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
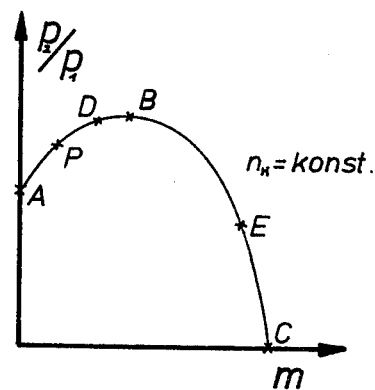
FIG. 1 is a diagram showing, for a jet engine with a predetermined rotary speed $n_H$ of the high-pressure compressor, the variation of the pressure ratio (outlet to inlet pressures of the high-pressure compressor) $p_2/p_1$ as a function of the mass flow.
Figure 2:
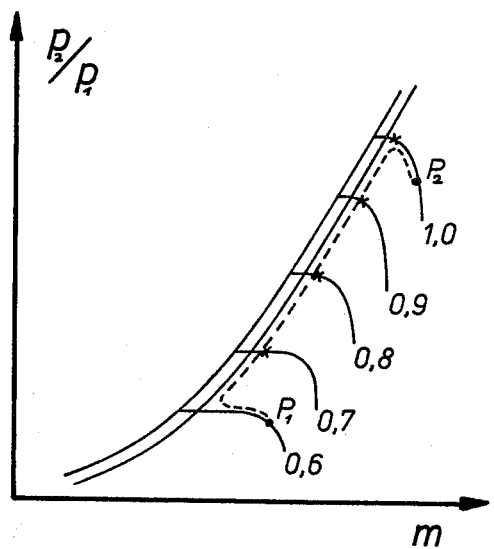
FIG. 2 is a diagram showing a family of curves similar to FIG. 1 for various rotary speeds of the high-pressure compressor, the runs of the surge line, of the surge line limit curve, and the variations of the engine states during the acceleration of the engine to a higher rotary speed.
Figure 3:
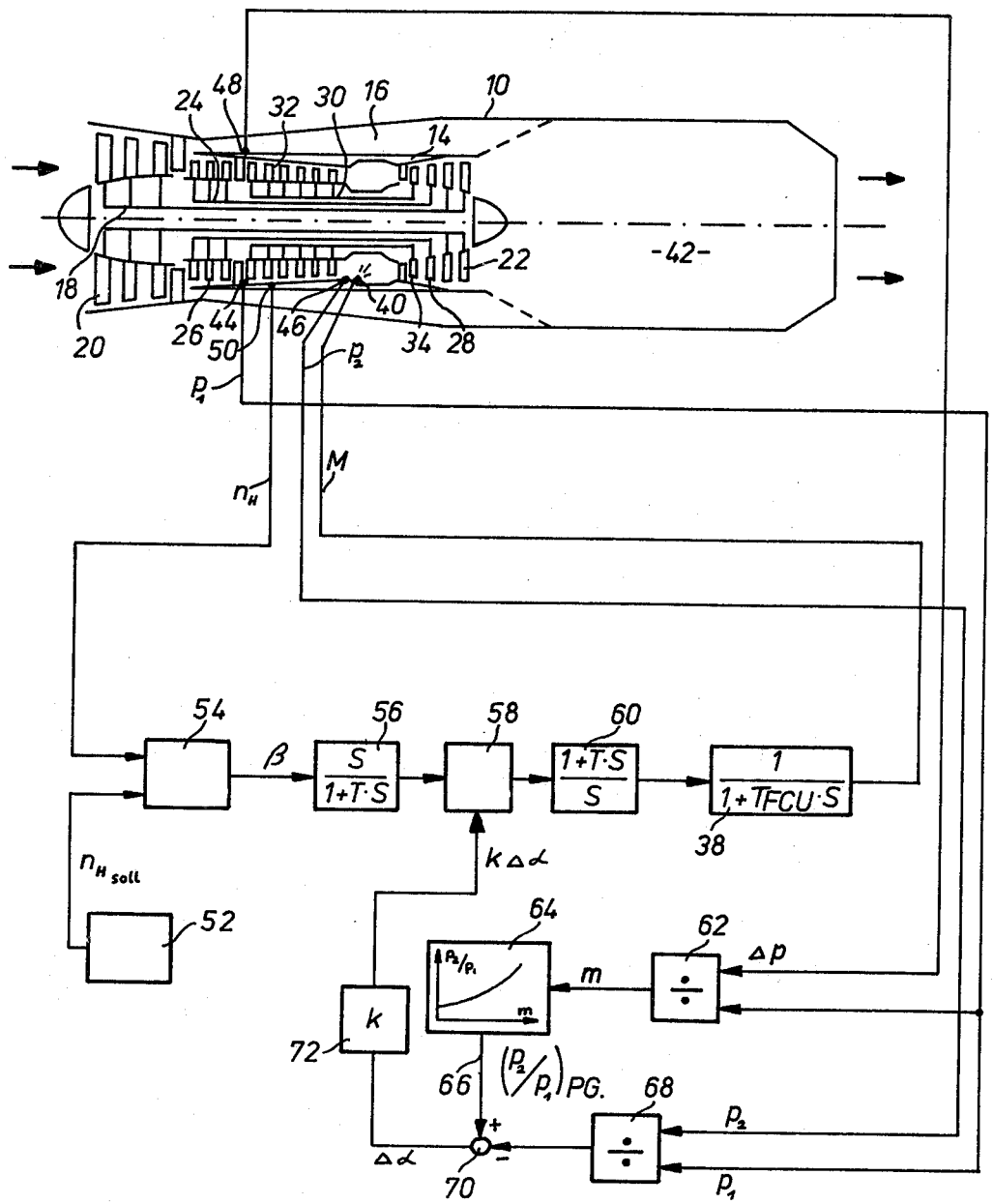
FIG. 3 shows schematically a jet engine as well as, in the form of a block diagram, a device for controlling rotary speed in accordance with the invention.

In FIG. 3 a known three-axes jet engine 10 is illustrated schematically. An inner casing 14 is mounted coaxially in the front portion of an outer casing 12. An annular chamber 16 is defined between the inner and the outer casings. A solid inner shaft 18 is mounted rotatably and coaxially within the inner casing 14. The inner shaft carries a low-pressure compressor 20 on its front end in front of the inner casing 14 and a turbine 22 on its rear end within the inner casing 14. The low-pressure compressor 20 extends both across the front opening of the inner casing and across the front opening of the annular chamber 16. Thus the low-pressure compressor 20 generates both an air stream through the inner casing 14 (the "hot" stream) and a relatively large air stream around the inner casing 14 through the annular chamber 16 (the "cold" stream).

A first outer shaft 24 in the form of a hollow shaft is mounted rotatably and coaxially with respect to the inner shaft 18. This first outer shaft 24 carries a medium-pressure compressor 26 on its front end within the inner casing 14 and downstream of the low-pressure compressor 20. A turbine 28 is mounted on the rear end of shaft 24 and positioned upstream of the turbine 22 of the inner shaft 18. A second outer shaft 30 in the form of a hollow shaft is mounted rotatably and coaxially around the first outer shaft 24. The second outer shaft 30 carries a high-pressure compressor 32 on its front end downstream of the medium-pressure compressor 26, and a turbine 34 on its rear end in front of the turbine 28 of the first outer shaft 24.

A combustion chamber 36 is defined within the inner casing 14 between the high-pressure compressor 32 and the associated turbine 34. A metered fuel flow is supplied continuously to said chamber by a fuel control unit 38 and through nozzles 40. The known mode of operation of such a jet engine is as follows: The air sucked into the inner casing 14 and compressed by the low-pressure compressor 20 is further compressed by the medium-pressure compressor 26 and the high-pressure compressor 32, and as a result the air is heated. Fuel is injected into the heated and compressed air in the combustion chamber 36. This fuel ignites and the hot combustion gases emerge with high velocity from the rear of the combustion chamber and through the rear of the inner casing 14. In a nozzle chamber 42 they mix with the cold air stream, which is directed by the low-pressure compressor 20 around the inner casing through the annular chamber 16. The air and combustion gas stream expelled with high velocity backwards from the nozzle chamber generates the thrust of the jet engine. The energy for driving the compressors 20, 26 and 32 is taken from the combustion gas stream by means of the turbines 22, 28 and 34, respectively. By using three separate shafts 18, 24 and 30 for three series-connected compressors, the rotary speeds may be made different and may be best adapted to the respective compression requirements.

The following designations will be used in the present specification:

$P_1$ = total pressure at the inlet of the high-pressure compressor 32,
$P_{10}$ = static pressure at the inlet of the high-pressure compressor 32,
$P_2$ = total pressure at the outlet of the high-pressure compressor 32,
$\Delta_p$ = difference of total pressure $p_1$ and static pressure $p_{10}$ at the inlet of the high-pressure compressor 32,
$n_H$ = rotary speed of the high-pressure compressor 32,
$n_{Hsoll}$ = commanded rotary speed of the high-pressure compressor 32,
T = filter time constants,
$T_{FCU}$ = time constant of the fuel control unit 38,
s = variable of the Laplace transform,
B = control device output signal,
M = fuel flow rate,
$\dot{M}$ = time derivative of the fuel flow rate,
m = mass flow of the high-pressure compressor 32,
$(p_2/p_1)_{PG}$ = limit pressure ratio, i.e., the ratio of $p_2$ and $p_1$ corresponding to the surge line limit curve for selected $n_H$ and m,
$\Delta d$ = surge line distance $(p_2/p_1)_{PG} - p_2/p_1$,
k = proportionality factor.

The jet engine 10 has sensors which provide signals indicative of the various operating parameters. An inlet pressure sensor 44 provides an inlet pressure signal which represents the total pressure $p_1$ at the inlet of the high-pressure compressor 32. An outlet pressure sensor 46 provides a signal which represents the total pressure $p_2$ at the outlet of the high-pressure compressor 32. A sensor 48 provides a signal which represents the difference $\Delta_p$ of total pressure $p_1$ and static pressure $p_{10}$ at the inlet of the high-pressure compressor 32. A rotary speed sensor 50 provides a signal which represents the rotary speed $n_H$ of the high-pressure compressor.

A commanded value generator 52 provides a signal which represents a commanded rotary speed $n_{Hsoll}$ for the high-pressure compressor. The signal $n_H$ from the rotary speed sensor 50 and $n_{Hsoll}$ signal from the commanded value generator 52 are applied to a control device 54. The control device 54 provides a control device output signal B which, when applied to the fuel control unit, causes a fuel flow to be metered at a rate by which the rotary speed $n_H$ is made equal to the commanded rotary speed $n_{Hsoll}$.

In order to prevent surging of the jet engine due to too high a fuel flow M with respect to the respective rotary speed $n_H$, the control device output signal B is, however, not aplied directly to the fuel control unit 38. Instead, differentiation of the control device output signal B with lag is effected by a filter 56 having a transfer function $$s/(1+T \cdot s)$$

The signal thus obtained, if the signal limiting means 58 are disregarded at first, is subsequently integrated with lead by a filter 60 in accordance with a transfer function $$(1+T \cdot s)/s$$

the time constant T of the lead network in filter 60 being equal to that of the lag network of filter 56. The resultant transfer function of the two filters is $$\frac{s}{1+T \cdot s} \cdot \frac{1+T \cdot s}{s} = 1$$

so that without the limitation (of limiting means 58) the control device output signal B is applied to the fuel control unit 38 unchanged, and controls the metered fuel flow M.

The signal $\Delta p$ from sensor 48 is applied to a quotient former 62 together with the inlet pressure signal $p_1$ from the inlet pressure sensor 44. The output signal $\Delta p/p_1$ of the qoutient former 62 provides a measure of the mass flow m of the high-pressure compressor 32. This output signal m is applied to a function generator 64 which at an output 66 provides a limit pressure ratio signal $(p_2/p_1)_{PG}$ associated with the mass flow m.

The outlet and inlet pressure signals $p_2$ and $p_1$, respectively, from the outlet pressure sensor 46 and the inlet pressure sensor 44, respectively, are applied to a quotient former 68 which forms the operating pressure ratio signal $p_1/p_2$.

At subtractor 70, the difference signal $$\Delta \alpha = (p_2/p_1)_{PG} - p_2/p_1$$

of the limit pressure ratio and of the actual operating pressure ratio, i.e., the surge line distance, is formed. This surge line distance is multiplied by a factor k at multiplier 72 and the resulting signal is applied to the signal limiting means 58.

The signal limiting means 58 select the smaller one of the two signals applied thereto, namely, the output from the filter 56 and the signal $k\Delta\alpha$, and connects the selected signal through the filter 60 to the fuel control unit 38. Thus if $k\Delta\alpha$ is sufficiently large and the jet engine is sufficiently far away from the surge line, there will be the described normal control of the rotary speed through the control output signal B. With an approach to the surge line limit curve, however, the signal $k\Delta\alpha$ will become effective as the selected signal, i.e., the smaller one of the two.

$T = T_{FCU}$ has been selected, i.e., the time constants T of the filters 56 and 60 are equalized with the time constant $T_{FCU}$ of the fuel control unit. Then is:

$$k\Delta\alpha \cdot \frac{1+Ts}{s} \cdot \frac{1}{1+T_{FCU}s} = M$$

or, because of $T_{FCU} = T$ $$k\Delta\alpha \cdot 1/s = M$$

$$\Delta\alpha = 1/k \cdot s \cdot M$$

or transformed back:

$$\Delta\alpha = \frac{1}{k} \dot{M}$$

Thus the limitation causes the time derivative $\dot{M}$ of the fuel flow M metered by the fuel control unit 38 to become proportional to the surge line distance $\Delta\alpha$.

The signal processing can be effected with analog signals. Preferably, however, the signals are digitalized and are processed digitally with known means.

Instead of use in the three-axes jet engine described as an example the invention can also be used, for example, in a single axis jet engine.

The determination of the quantity M is also possible with another transfer function of the FCU.

The manner of determining the time derivative of a quantity difficult to determine otherwise, as described in connection with the determination of the time derivative $\dot{M}$ of the metered fuel flow, may be used also in other connection, for example for determining the time derivative of an elevator or rudder deflection.

We claim:

1. In an apparatus for controlling the rotary speed in jet engines for aircraft and comprising:

a rotary speed sensor which provides a rotary speed signal representing the rotary speed of the high-pressure compressor of the jet engine, a commanded value generator which provides a commanded value signal representing a commanded rotary speed, a control device, to which the rotary speed signal and the commanded value signal are applied and which provides a control deviation signal, a fuel control unit controlled by the control deviation signal for controlling the rate of fuel flow supplied to the jet engine, a pressure ratio generator for generating a pressure ratio signal which represents the pressure ratio of the outlet and the inlet pressures of the high-pressure compressor, a mass flow sensor for generating a mass flow signal representing the mass flow of the jet engine, a function generator which provides the surge line of the jet engine or a surge line limit curve running at a safety margin therefrom in the form of a limit pressure ratio signal as a function of the mass flow signal, and signal limiting means between control device and fuel control unit for effecting limitation of the control deviation signal in accordance with the surge line distance obtained as difference of the limit pressure ratio signal and the pressure ratio signal, the improvement comprising:

said signal limiting means limiting the time derivative of the fuel flow rate to a value substantially proportional to the surge line distance.

2. In an apparatus as set forth in claim 1,
wherein the fuel control unit has a predetermined transient response,
including means between the control device and the signal limiting means for differentiating the control deviation signal with a lag, which lag is equal to said transient response of the fuel control unit, and
including means between the signal limiting means and the fuel control unit for integrating the limited control deviation signal with a lead corresponding to said lag.

3. Apparatus for the control of acceleration processes in aircraft gas turbine engines of the type having a compressor (32) operating in front of a combustion chamber (36) and a turbine (34) operating behind the combustion chamber (36), and having a fuel control unit (38) for supplying a fuel flow rate (M) to the combustion chamber (36), the apparatus comprising means (46, 44, 68) for measuring the actual ratio of pressures ($p_2$, $p_1$) at the outlet and the inlet of the compressor (32) and providing output signal values ($p_2/p_1$) indicative thereof, means (70) for comparing the actual measured compressor pressure ratio signal values ($p_2/p_1$) with predetermined pressure ratio signal values ($p_2/p_1$)$_{PG}$ for an operating range of the engine, which predetermined pressure ratio signal values are set below the ratio level signal value (surge line) corresponding to compressor surge over the operating range of the engine, and for providing a difference signal value surge line distance ($\Delta\alpha = (p_2/p_1)_{PG} - (p_2/p_1)$) therefrom, and means (56, 58, 60) receiving a signal ($k\Delta\alpha$) proportional to said difference signal value ($\Delta\alpha$) and the metered fuel flow value (B) from a speed governor of the engine for limiting the fuel flow during acceleration such that said predetermined pressure ratio signals (surge line limit curve) are not exceeded, said limiting means including means (56, 58, 60) for limiting the time derivative ($\dot{M}$) of the fuel flow rate (M) to a value ($k\Delta\alpha$) proportional to said difference signal value ($\Delta\alpha$).

* * * * *